United States Patent [19]

Kühne et al.

[11] Patent Number: 4,935,502
[45] Date of Patent: Jun. 19, 1990

[54] DIAZO COMPOUNDS, A PROCESS FOR THEIR PREPARATION AND THEIR USE AS COLORANTS

[75] Inventors: Rudolf Kühne, Frankfurt am Main; Heinrich Hamal, Liederbach, both of Fed. Rep. of Germany

[73] Assignee: Hoechst Aktiengesellschaft, Frankfurt am Main, Fed. Rep. of Germany

[21] Appl. No.: 396,988

[22] Filed: Aug. 22, 1989

Related U.S. Application Data

[63] Continuation of Ser. No. 695,740, Jan. 28, 1985, abandoned, which is a continuation of Ser. No. 516,866, Jul. 25, 1983, abandoned, which is a continuation of Ser. No. 378,409, May 17, 1982, abandoned, which is a continuation of Ser. No. 183,449, Sep. 2, 1980, abandoned.

[30] Foreign Application Priority Data

Sep. 4, 1979 [DE] Fed. Rep. of Germany ..... 29356385

[51] Int. Cl.$^5$ .................. C09B 35/22; C09B 35/035; D06P 1/18; D06P 1/44
[52] U.S. Cl. ................................. 534/742; 106/447; 106/448; 106/494; 106/483; 106/498; 534/573; 534/575; 534/581; 534/582; 534/887
[58] Field of Search .......................................... 534/742

[56] References Cited

U.S. PATENT DOCUMENTS

3,109,842 11/1963 Schilling et al. ................. 534/742 X
4,169,091 9/1979 Kuhne et al. .................... 534/742 X

FOREIGN PATENT DOCUMENTS

2434432 2/1975 Fed. Rep. of Germany ...... 534/742
2658396 6/1978 Fed. Rep. of Germany ...... 534/742
1438900 6/1976 United Kingdom ................ 534/742

*Primary Examiner*—Floyd D. Higel
*Attorney, Agent, or Firm*—Curtis, Morris & Safford

[57] ABSTRACT

When a diamine of the formula

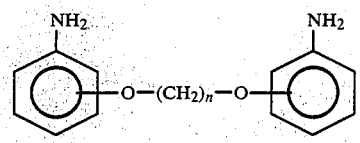

in which n is 1 to 4, is bis-diazotized and the resulting bis-diazo compound is coupled with 2 moles of one or more coupling components of the formula

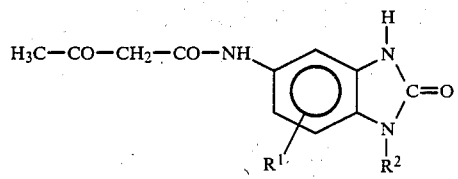

in which $R^1$ is hydrogen, chlorine, bromine, methyl or methoxy and $R^2$ is hydrogen or, if $R^1$ is hydrogen, also methyl or ethyl, disazo compounds are obtained which are colorants. Due to their high fastness to light and to migration and their heat stability and dispersibility, these compounds are useful for pigmenting high molecular weight materials, especially polyolefins.

1 Claim, No Drawings

DIAZO COMPOUNDS, A PROCESS FOR THEIR PREPARATION AND THEIR USE AS COLORANTS

This application is a continuation of application Ser. No. 695,740, filed Jan. 28, 1985 which is a continuation of application Ser. No. 516,866 filed July 25, 1983, which in turn is a continuation of application Ser. No. 378,409 filed May 17, 1982, which is a continuation of application Ser. No. 183,449 filed Sept. 2, 1980, all abandoned.

The present invention relates to new, valuable symmetrical and assymetrical disazo compounds, which are derived from glycol phenol ethers, and mixtures thereof, a process for their preparation and their use as colorants.

Disazo dyes in which the diazo component is 1,2-bis-(p-aminophenyl ethylene glycol ether) have already been disclosed in German Patent Specification 47,301. The disazo compounds obtained from this bis-diazo component with conventional coupling components resulting in pigments, for example acetoacetylaminobenzene, have very poor fastness to light and a very low tinctorial strength.

Analogous disazo compounds in which the coupling component is barbituric acid or a derivative of barbituric acid have been disclosed in German Offenlegungsschrift 2,434,432. The disazo compounds obtained in this way are likewise unsatisfactory in respect of the fastness to light and the tinctorial strength.

Furthermore, disazo pigments have been disclosed in German Patent Specification 2,658,396 which are prepared by coupling bis-diazotized bis-(amino-phenoxy-)alkanes containing nitro groups with acetoacetylaminobenzenes and 1-arylpyrazol-5-ones. Compared with these disazo compounds, the disazo compounds according to the invention are distinguished by a considerably increased fastness to light, improved fastness to over-lacquering in lacquers and improved fastness to migration in plastics and by increased stability to heat.

The invention relates to new symmetrical and asymmetrical disazo compounds of the general formula 1

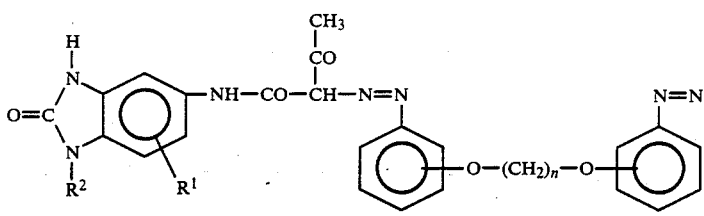

and mixtures thereof, in which the radicals $R^1$ can be identical or different, are preferably linked to the 7 to 6 position, and denote hydrogen, chlorine or bromine atoms or methyl or methoxy groups, each radical $R^2$ is a hydrogen atom and, if the substituent $R^1$ belonging to the same ring system is a hydrogen atom, may also be a methyl or ethyl group, the two $R^2$s being identical or different, and n is a number from 1 to 4, and in particular the disazo compound of the general formula 1 in which $R^1$ and $R^2$ are hydrogen atoms, the ether oxygen atoms are in the 2-position relative to the azo groups and n is 2.

The invention also relates to a process for the preparation of the abovementioned disazo compounds and mixtures thereof, which process comprises bis-diazotizing 1 mole of a symmetrical diamine of the general formula 2

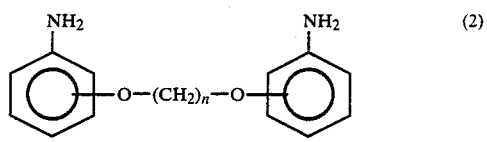

in which n denotes a number from 1 to 4, preferably 2, and allowing the resulting bis-disazonium salt to act on 2 moles of one or more coupling components of the general formula 3

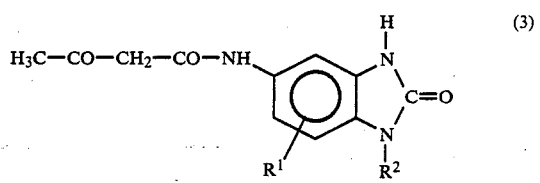

in which $R^1$ and $R^2$ are as defined above, in an aqueous or organic medium.

The invention also relates to the use of the disazo compounds of the general formula 1 and mixtures thereof as colorants, especially for pigmenting high molecular weight organic material.

The symmetrical diamines which are suitable as diazo components are known from the literature and can be prepared, for example, by reacting 2 moles of an alkali metal salt of a nitrophenol with 1 mole of a dihalogenoalkane, for example a dibromoalkane, in particular dibromomethane, 1,2-dibromoethane, 1,2-dibromopropane or 1,4-dibromobutane, to give the corresponding bis-(nitro-phenoxy)-alkanes and then reducing the nitro groups to amino groups. The corresponding bis-(2-nitro-phenoxy)-alkanes and bis-(4-nitro-phenoxy)-alkanes in which n is greater than 1 are furthermore obtained by reacting 2-nitro-chlorobenzene or 4-nitro-chlorobenzene with the particular glycol in a preferably aprotic solvent, such as, for example, dimethylformamide, dimethylsulfoxide or N-methylpyrrolidone, in the presence of a suitable basic condensing agent. The diamines are also accessible by reacting the acylaminophenols, in particular the acetamino-phenols, with dihalogenoalkanes to give bis-(acylamino-phenoxy)-alkanes and subsequently splitting off the acyl groups.

Suitable symmetrical diamines are preferably 1,2-bis-(2-amino-phenoxy)-ethane, which is readily accessible industrially, and also bis-(2-amino-phenoxy)-methane, bis-(3-amino-phenoxy)-methane, bis-(4-amino-phenoxy)-methane, 1,2-bis-(3-amino-phenoxy)-ethane, 1,2-bis-(4-amino-phenoxy)-ethane, 1,3-bis-(2-amino-phenoxy)-propane, 1,3-bis-(3-amino-phenoxy)-propane, 1,3-bis-(4-aminophenoxy)-propane, 1,4-bis-(2-amino-phenoxy)- butane, 1,4-bis-(3-amino-phenoxy)-butane and 1,4-bis-(4-aminophenoxy)-butane.

The bis-diazotization of the symmetrical diamines of the general formula 2 is preferably carried out with alkali metal nitrites and a mineral acid in water, and it can be appropriate to add surface-active substances in the sense of nonionic, cationic or anionic wetting agents, dispersing agents and emulsifiers and/or weak to moderately strong organic or inorganic acids, such as, for example, formic acid, acetic acid, propionic acid or phosphoric acid. The bis-diazotization can also be carried out with nitrosylsulfuric acid or in an organic medium with an alkyl nitrite, for example with n-butyl nitrite.

Suitable coupling components are, in particular, 5-acetoacetylamino-benzimidazolone, and also 6-chloro-5-acetoacetylamino-benzimidazolone, 7-chloro-5-acetoacetylamino-benzimidazolone, 6-bromo-5-acetoacetylaminobenzimidazolone, 6-methyl-5-acetoacetylamino-benzimidazolone, 7-methyl-5-acetoacetylamino-benzimidazolone, 6-methoxy-5-acetoacetylamino-benzimidazolone, 7-methoxy-5-acetoacetylamino-benzimidazolone, 1-methyl-5-acetoacetylamino-benzimidazolone and 1-ethyl-5-acetoacetylamino-benzimidazolone.

Pigment mixtures which are of particular interest from the point of view of applications technology are obtained when the bis-diazonium salt is allowed to act on a mixture of several, preferably two, different coupling components. In this case, mixtures of symmetrical and asymmetrical disazo compounds are formed; in the case of two coupling components, two symmetrical and one asymmetrical compounds are obtained. The resulting pigment mixtures are not to be understood exclusively as mechanical mixtures, since, in respect of pigment ripening, for example during the thermal aftertreatment, the individual disazo compounds influence one another in the physical sense. Because of this it is possible, by means of a tailored mixed coupling of this type, to change the technological properties in the desired sense, for example to shift the shade towards the red or green or to influence the transparency or the rheological properties, and in particular it can be especially appropriate to add a second coupling component in small amounts.

The disazo compounds according to the invention, and mixtures thereof, are prepared by coupling, using processes which are in themselves known, preferably by combining the bis-diazonium salts with the coupling component or a mixture of coupling components in an aqueous medium, and it can be appropriate to add the abovementioned surface-active substances. Likewise, it can be advantageous in some cases to carry out the coupling reaction in the presence of suitable organic solvents, for example with the addition of alcohols, such as lower alkanols, dioxan, tetrahydrofuran, formamide, dimethylformamide, dimethylsulfoxide, N-methyl-pyrrolidone, pyridine bases of quinoline bases. It is also possible to dissolve the coupling component in a suitable organic solvent and to allow the aqueous bis-diazonium salt solution to act on this solution, preferably in the presence of a buffer, for example an alkali metal acetate. In this case, it can be appropriate to add suitable organic bases, for example pyridine bases or alkylamines, as proton acceptors. With regard to the nature of the grain and the crystal structure of the resulting disazo compounds and mixtures thereof, it is frequently advantageous to subject the coupling suspension, after the coupling reaction, to a thermal aftertreatment, for example to heat it to a higher temperature, to boil it or to keep it under pressure at temperatures which are above the boiling point under normal pressure, for some time. The effect of the thermal aftertreatment can frequently be further intensified by the addition of suitable organic solvents, such as, for example, alkanols, glacial acetic acid, nitrobenzene, halogenobenzenes, halogenonaphthalenes, phthalic acid monoesters and diesters, pyridine bases, quinoline bases, dimethylformamide, dimethylsulfoxide or N-methylpyrrolidone, and/or the addition of surface-active substances.

Furthermore, in some cases it can be appropriate to carry out even the coupling reaction at elevated temperature, for example at 40° to 60° C. The disazo compounds according to the invention, and mixtures thereof, can, furthermore, be extended in the coupling suspension or in the presscake by conventional methods, for example with metal salts of higher fatty acids or with metal resinates, or with the free saturated or unsaturated fatty acids themselves or also with free resin acids, such as are obtained from the acid precipitation of alkali metal resinates, or with fatty amines and/or their salts. Moreover, it is also possible to incorporate mineral oils, silicone oils, fatty oils, fats and resins, as the solid substances or in an emulsified form, and to incorporate suitable synthetic resin dispersions and dispersions of other high molecular weight bodies. Furthermore, the disazo compounds according to the invention, and mixtures thereof, can be prepared in the presence of a carrier, for example barytes.

Particularly pure and intense pigments which have properties which are valuable from the standpoint of applications technology are obtained when the disazo compounds according to the invention, and mixtures thereof, are subjected, after they have been separated off from the coupling suspension, in the form of the moist presscake or in the form of the dry powder, to a thermal after-treatment with organic or aqueous-organic solvents of solvent mixtures, if desired with the addition of suitable surface-active substances. An after-treatment of this type, which in particular has an influence on the crystallographic parameters, can be effected, for example, with alcohols, specially lower alkanols, glacial acetic acid, pyridine bases, quinoline bases, N-methylpyrrolidone, formamide, dimethylformamide, dimethylsulfoxide, nitrobenzene, halogenobenzenes and halogenonaphthalenes. It is also possible to influence the final constitution of the grains of the resulting pigments by means of dry or moist grinding, if appropriate with the addition of suitable grinding aids or extenders.

The disazo compounds according to the invention, and mixtures thereof, are valuable yellow colorants. They are insoluble in water and insoluble in the conventional organic solvents and are outstandingly suitable for pigmenting high molecular weight organic material. They display high tinctorial strength, high fastness to light and very good stability to heat. They are outstandingly suitable for dyeing and printing plastics, natural and synthetic resins, rubber, paper, viscose, cellulose, cellulose esters, cellulose ethers, polyvinyl chloride, polyamides, polyolefins, halogenated polyolefins, polystyrene, polyurethanes, polyacrylonitrile, polyglycol terephthalates or copolymers based on acrylonitrile-/butadiene/styrene (ABS copolymers) and also for the preparation of printing inks, colored lacquers and emulsion paints and for pigmenting printing pastes for graphical and textile printing and printing on plastic and metal surfaces.

The pigments can be worked readily in the media mentioned. Due to the high stability to heat and the good dispersing properties, the pigments according to the invention, and mixtures thereof, are outstandingly suitable for incorporation in extrudable plastics such as polyolefins and in particular in high-pressure and low-pressure polyethylene and polypropylene. They are also outstandingly suitable for spin-dyeing polyolefins, specially polypropylene, pigmented filaments with a good depth of color, very good fastness to light and outstanding textile fastness properties, such as fastness to washing, fastness to perspiration, fastness to rubbing, fastness to solvents, fastness to cross-dyeing and fastness to thermofixing, being obtained, the color of which is also stable on subjection to hypochlorite bleach and on treatment with the conventional shampooing agents. Compared with the nearest comparable pigments of German Patent Specification 2,658,396, the pigments according to the invention, and mixtures thereof, have a considerably higher fastness to light, improved fastness to over-lacquering in lacquers, improved fastness to migration in plastics and increased stability to heat.

In the examples which follow, the percentages are by weight unless indicated otherwise.

EXAMPLE 1

24.4 g of 1,2-bis-(2-amino-phenoxy)-ethane are stirred with 100 ml of 5N hydrochloric acid for several hours at room temperature, the mixture is cooled in an ice bath and, after adding 65 g of ice, diazotization is effected in the conventional manner by the dropwise addtion of 41 ml of 5N sodium nitrite solution. After clarifying the resulting bis-diazonium salt solution with kieselguhr and active charcoal, excess nitrite is destroyed, immediately prior to the coupling reaction, by adding a small amount of amidosulfonic acid.

46.6 g of 5-acetoacetylamino-benzimidazolone, 800 ml of water and 54 ml of a 33% strength aqueous sodium hydroxide solution are stirred for 30 minutes at room temperature, the mixture is clarified after adding 3 g of kieselguhr and 6 g of active charcoal, and the filtrate is made up to 1,000 ml with water. After adding 250 g of ice and 0.5 g of a coupling assistant (sodium salt of an alkylsulfamidoacetic acid, obtained by half-sulfochlorination of a hydrocarbon fraction with a boiling range of 230°–250° C. and subsequent reaction with aminoacetic acid), dissolved in about 10 ml of water, the coupling component is precipitated in finely divided form by the rapid addition of 35 ml of glacial acetic acid, using a high-speed stirrer. The temperature is 5°–7° C. The pH value is adjusted to 6.0.

The coupling reaction with the bis-diazonium salt solution described above takes place in the course of 2–3 hours at a temperature of 18°–20° C., the bis-diazonium salt solution running in beneath the surface of the vigorously stirred coupling suspension at a rate such that there is never any excess diazonium salt detectable in the coupling mixture. During the coupling reaction the pH value is kept constant at 6.0 by adding small amounts of 2N sodium hydroxide solution.

After the coupling reaction has ended, the temperature of the coupling suspension is raised to 90° C. in the course of 30 minutes by passing in steam, the temperature is kept at 90°–95° C. for 30 minutes and the suspension is then cooled to about 70° C. by adding water. The suspension is filtered at this temperature and the filter residue is washed with water until salt-free.

The resulting presscake is stirred with 1,700 ml of water to give a homogeneous suspension and, after adding a 10% strength aqueous solution of 0.7 g of an adduct of 25 moles of ethylene oxide and 1 mole of stearyl alcohol, the mixture is heated at 150° C. in a stirred autoclave for 5 hours. After cooling, the pigment is filtered off, washed with a little water and dried at 70° C. in a vacuum drying cabinet. After grinding, an intense yellow pigment powder is obtained, which has the following chemical constitution.

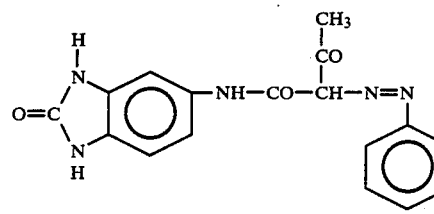
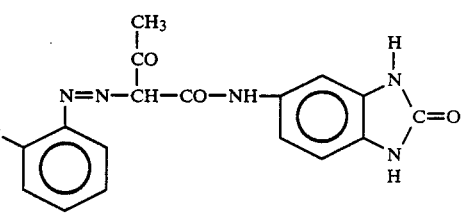

3.8 g of the pigment obtained in this way and 62.5 ml of glass spheres 3 mm in diameter are shaken with 27.4 g of 25% strength alkyd resin grinding base in a closed plastic beaker of 125 ml capacity for 60 minutes on a "paint shaker". 44.8 g of a 56% strength alkyd resin/-melamine resin clear lacquer are then mixed in and the glass spheres are then removed by sieving off. The full shade colored lacquer containing 5% pigment, which is prepared in this way, is mixed with 1.25 times the amount by weight of a white stoving lacquer, which is likewise built up on an alkyd resin/melamine resin basis and contains 20% of titanium dioxide as white pigment. The "whitened" lacquer obtained in this way is coated onto cardboard with the aid of a hand coater and after exposing the air for 30 minutes is stoved at 140° C. in a drying cabinet. A lacquer coating is obtained which has good depth of shade, very good fastness to light and very good stability to chemicals and in particular to solvents.

To test the fastness to over-lacquering, the full shade colored lacquer containing 5% of pigment is coated onto cardboard using the hand coater and stoved in the conventional manner for 30 minutes at 140° C. Part of the coloration is then covered with white lacquer and again stoved for 30 minutes at 140° C. The fastness to over-lacquering proves to be flawless, that is to say the white over-lacquering shows no trace of any staining by the pigment coating located beneath it. The same result is obtained if stoving is carried out for 30 minutes at 180° C.

EXAMPLE 2

The procedure is as described in Example 1 except that the after-treatment is carried out with dilute isobutanol. The presscake which has been washed salt-free is mixed to a paste with water and isobutanol is added in an amount such that a 4% strength suspension of the pigment in a 50% strength isobutanol/water mixture is obtained.

This mixture is heated to 150° C. in the course of 1 hour in a stirred autoclave and is kept at this temperature for 3 hours. After cooling to about 80° C., the isobutanol is distilled off azeotropically by passing in steam. The aqueous pigment suspension is filtered and the pigment is washed with a little water and dried at 70° C. in a vacuum drying cabinet. An intense yellow pigment powder is obtained which has properties similar to those of the pigment prepared according to Example 1.

67 g of plasticized polyvinyl chloride, 33 g of dioctyl phthalate, 0.1 g of the resulting pigment and 0.5 g of titanium dioxide are mixed for 5 minutes on a roll mill and the mixture is then processed to a film. The yellow coloration of this film is distinguished by high depth of shade and a clear color shade and by very good fastness to light and to migration.

To test the fastness to migration, the resulting colored film is covered on both sides with two white films and stored in close contact with the latter for 2 hours at 140° C. After this period, no trace of any colored staining is discernible on the white films.

For coloring polyethylene, 1.0 g of the resulting pigment, 10 g of a titanium dioxide white pigment of the rutile type and 1,000 g of polyethylene granules of high density are pre-mixed for 5 minutes in a laboratory shaking mixer. The pre-mix obtained in this way is plasticized using a laboratory extruder, taken off in strands and then granulated. These granules are processed in a laboratory injection molding machine to give injection molded sheets 2.5 mm thick. Yellow samples of good depth of shade, high color clarity and good fastness to light and with excellent stability to heat are obtained. The polyethylene used has a melt index MFI 190/5 (according to DIN 53,735) of 20–25 g/10 minutes. The density is 0.958 g/cm$^3$.

To test the stability to heat, two series of injection molded sheets are produced, for which, in addition to the molding cycle, a residence time of 1 minute and of 5 minutes at the particular injection molding temperature is maintained. The injection molding temperatures are 200°, 220°, 240°, 260°, 280° and 300° C. The injection molded sheets are then examined colorimetrically to determine whether any color changes have occurred, the colorimetric measurement being carried out in accordance with DIN 5033 and the color differences being calculated in accordance with DIN 6174. The injection moldings obtained using the pigment prepared according to the invention display outstanding stability to heat. Based on the permissible color tolerance of $\Delta E_{ab}^* = 3$, the moldings obtained using a residence time of 1 minute are stable at a temperature of 300° C. and the moldings obtained using a residence time of 5 minutes are stable at a temperature of 290° C.

When the test is carried out with polypropylene, similarly good properties are found.

For mass coloration of a polystyrene injection molding composition, 1.0 g of the pigment obtained, 10 g of a titanium dioxide white pigment of the rutile type and 1,000 g of polystyrene homopolymer (glass-clear, powder) are pre-mixed in a laboratory high-speed mixer for 1½ minutes at room temperature and at a speed of 3,600 revolutions/minute. Further processing and the test to determine the stability to heat are carried out as described above for the coloration of polyethylene. Yellow injection moldings of good depth of shade, high color clarity, good fastness to light and outstanding stability to heat are obtained. Based on the permissible color tolerance of $\Delta E_{ab}^* = 3$, the moldings obtained using a residence time of 1 minute and the moldings obtained using a residence time of 5 minutes are stable to heat at a temperature of 300° C.

If the pigment obtained is incorporated in the manner described in a copolymer of acrylonitrile/styrene/butadiene (ABS copolymer), yellow injection moldings of good depth of shade, good fastness to light and good stability to heat are obtained. Based on the permissible color tolerance of $\Delta E_{ab}^* = 3$, the moldings obtained using a residence time of 1 minute are stable to heat at a temperature of 290° C. and the moldings obtained using a residence time of 5 minutes are stable to heat at a temperature of 270° C.

The following procedure is used to produce a pigmented blown film based on polyethylene:

2,200 parts of the pigment obtained are initially introduced into a coolable paddle kneader and, with the kneader in operation, are mixed with 3,300 parts of polyethylene wax with a melting range of 80°–90° C., which has been heated to 140° C., and the mixture is homogenized by kneading for one hour. After cooling, the resulting preparation containing 40% of pigment is comminuted to give granules. These granules are introduced into the feed hopper of a metering device, where they are fed in an amount of 2.5%, based on the film-forming polymer, into the inlet zone of the extruder screw of a blown film installation, which is fed with polyethylene which has a melt index MFI 190/2,16 (according to DIN 53,735) of 2–3 g/10 minutes and a density of 0.923 g/cm$^3$. Homogeneously colored yellow films of good depth of shade, high color clarity and very good fastness to light are obtained.

The following procedure is used for the incorporation of the pigment according to the invention in a spinning melt based on polypropylene and the production of pigmented filaments:

2,200 g of pigment are initially introduced into a coolable paddle kneader of 20 liters capacity and, with the kneader in operation, are mixed with 3,300 g of polyethylene wax with a melting range of 80°–90° C., which has been heated to 140° C., and the mixture is then homogenized by kneading for one hour. After cooling, the highly pigmented preparation obtained in this way is comminuted to give granules. These granules are introduced into the feed hopper of a conveyor-type weigh feeder, where it is fed in an amount of 2.5%, based on the fiber-forming polymer, into the inlet zone of a twin screw extruder, which is fed with an isotactic polypropylene which has a melt index MFI 230/2,16 (according to DIN 53,735) of 10–12 g/10 minutes and a density of 0.92 g/cm$^3$. At the end of the extruder, the pigmented polymer melt is pressed at 270° C., by means of a gear pump, through a perforated plate, which has 24 holes with an internal diameter of 150 μm, and the resulting filaments are taken off at a speed of 1,250 m/minute via two godets and wound up on cylindrical bobbins. After stretching the spun filaments, a filament yarn of 72 dtex is obtained which consists of 24 individual filaments and has a breaking length of 47 km and an elongation at break of 27% and is distinguished by a neutral yellow color shade of high clarity, good depth of shade, very good fastness to light and outstanding textile fastness properties. The fastness to washing was determined in accordance with DIN 54,010, the fastness to alkaline and acid perspiration in accordance with DIN 54,020, the fastness to dry and wet rubbing in accordance with DIN 54,021, the fastness to solvents in accordance with DIN 54,023, the fastness to hypochlorite bleach in accordance with DIN 54,034, the fastness to cross-dyeing in a bath containing acetic acid in accordance with DIN 54,049 and the fastness to thermofixing in accordance with DIN 54,060 (30 seconds at 150° C.). In addition, the fastness to shampooing was found to be flawless.

EXAMPLE 3

The procedure is as described in Example 1 except that 23.0 g of bis-(2-amino-phenoxy)-methane are employed as the diazo component. After the coupling reaction, the coupling suspension is first heated to 90° C. by passing in steam, and kept at 90°–95° C. for 2 hours. The suspension is cooled to about 70° C. by adding water and the product is filtered off and washed with water until salt-free. The resulting moist presscake is mixed to a paste with water and isobutanol is added in an amount such that a suspension which contains 4% of solids in a 50% strength isobutanol/water mixture results. This mixture is heated to 150° C. in the course of 1 hour in a stirred autoclave and is then kept at this temperature for 5 hours. After cooling to about 90° C., the isobutanol is distilled off azeotropically by blowing in steam. The resulting aqueous pigment suspension is filtered and the pigment is dried in a vacuum drying cabinet at 70° C. After grinding, a soft textured, intense yellow pigment powder is obtained which has coloristic properties similar to those of the pigment prepared according to Example 1.

EXAMPLE 4

The procedure is as described in Example 1, except that 25.8 g of 1,3-bis-(2-amino-phenoxy)-propane are employed as the diazo component and 1.0 g of dodecyl-dimethyl-benzyl-ammonium chloride is employed as a coupling assistant. The coupling reaction and the thermal after-treatment of the coupling suspension are carried out as described in Example 1. The presscake which has been washed until salt-free is mixed to a paste with water and isopropanol is added in an amount such that a suspension which contains 4% of solids in a 50% strength isopropanol/water mixture results. The mixture is heated to 120° C. in a stirred autoclave and kept at this temperature for 5 hours. After cooling, the suspension is filtered and the pigment is washed, first with a little 50% strength isopropanol and then with water, and dried in a vacuum drying cabinet at 70° C. After grinding, an intense yellow pigment powder is obtained which has coloristic properties similar to those of the pigment prepared according to Example 1.

EXAMPLE 5

The procedure is as described in Example 1, except that 27.2 g of 1,4-bis-(2-amino-phenoxy)-butane are used as the diazo component and 1.0 g of a condensation product of oleyl chloride and N-methyltaurine is employed as a coupling assistant. The coupling reaction and the thermal after-treatment of the coupling suspension are carried out as indicated in Example 1. The moist presscake which has been washed until salt-free is mixed to a paste with water and isopropanol is added in an amount such that a suspension which contains 3% of solids in a 40% strength isopropanol/water mixture forms. The mixture is heated to 150° C. in the course of 1 hour in a stirred autoclave and kept at this temperature for 3 hours. After cooling, the mixture is filtered and the pigment is washed, first with 40% strength isopropanol and then with water, and dried in a vacuum drying cabinet at 70° C. After grinding, an intense yellow pigment powder is obtained which has coloristic properties similar to those of the pigment prepared according to Example 1.

15 g of the pigment are incorporated in 4 passes on a three-roll mill in 85 g of a commercially available letterpress varnish, which has the following composition: 40% of phenolic resin, modified with colophony, 20% of varnish-type linseed oil and 40% of mineral oil with a boiling range of 280°–310° C.

Using the resulting yellow letterpress ink, which has good rheological properties and can be printed easily, prints with a color coating of 1 g/m$^2$ are produced on white art paper using a specimen printing machine. Very intense, greenish-tinged yellow prints of high color clarity, good surface gloss and good fastness to light are obtained. They display very good stability to ethyl alcohol and lacquer solvent (consisting of 50% of ethyl acetate, 40% of toluene and 10% of n-butanol), alkalis and acids and show no bleeding phenomena when exposed to a soap gel or butter.

EXAMPLE 6

53.52 g of 7-chloro-5-acetoacetylamino-benzimidazolone are dissolved cold in 600 ml of water and 60.6 g of a 33% strength aqueous sodium hydroxide solution and, after adding 2 g of kieselguhr and 2 g of active charcoal, the solution is clarified. The volume of the filtrate is made up to 800 ml and the temperature is brought to 15° C. After adding 100 ml of a 10% strength aqueous solution of a coupling assistant, consisting of the sodium salt of the condensation product of 1 mole of oleic acid and 1 mole of N-methylaminoacetic acid, the mixture is rendered strongly alkaline by adding 83 g of 33% strength sodium hydroxide solution and the coupling component is then precipitated with 71.6 g of 85% strength phosphoric acid, whilst stirring with a high-speed stirrer. The pH value of the resulting finely divided suspension of the coupling component is adjusted to 6.9 and the temperature is brought to 40° C.

The coupling reaction with a bis-diazonium salt solution prepared according to Example 1 is carried out at 40° C. in the course of about 2 hours. After the coupling reaction, the mixture is heated to 90° C. by passing in steam and is kept at this temperature for 2 hours. The mixture is cooled to 70° C. by adding water and the coupling product is filtered off at this temperature and washed with water until salt-free. The resulting presscake is mixed to a paste with water and isobutanol is added in an amount such that a 4% strength suspension of the pigment in 50% strength isobutanol is obtained. This mixture is heated at 150° C. in a stirred autoclave for 5 hours. After cooling to about 90° C., the isobutanol is distilled off azeotropically by passing in steam. The resulting aqueous pigment suspension is filtered and the pigment is washed with a little water and dried in a vacuum drying cabinet at 70° C. An intense yellow pigment powder is obtained which, compared with the pigment prepared according to Example 1, has similarly good technological properties but a significantly more greenish-tinged color shade.

EXAMPLE 7

The procedure is as described in Example 1, except that 23.0 g of bis-(4-amino-phenoxy)-methane are employed as the diazo component. The coupling reaction and the after-treatment of the coupling suspension are carried out as in Example 1. The presscake obtained in this way contains a brownish-yellow, crystallographically unstable pigment. For conversion to the stable modification, the moist presscake is stirred with water and isobutanol is added in an amount such that a suspension containing 4% of solids in a 50% strength isobutanol/water mixture forms. This mixture is heated at 150° C. in a stirred autoclave for 5 hours. After cooling to about 90° C., the isobutanol is distilled off azeotropically by passing in steam. After filtering off, drying and grinding, an intense orange colored pigment powder is obtained. If the resulting pigment is incorporated in a stoving lacquer as described in Example 1, orange colorations are obtained which have a good depth of shade, very good fastness to light, very good stability to chemicals and in particular to solvents and excellent fastness to over-lacquering.

EXAMPLE 8

23.3 g of 5-acetoacetylamino-benzimidazolone and 26.8 g of 7-chloro-5-acetoacetylamino-benzimidazolone are dissolved in 600 ml of dimethylsulfoxide and 30 ml of an aqueous 4N sodium acetate solution are added. The coupling reaction with a bis-diazonium salt solution prepared in accordance with Example 1 from 24.4 g of 1,2-bis-(2-amino-phenoxy)-ethane is carried out at 18°–20° C. in the course of about 1 hour, 120 ml of 4N sodium acetate solution also being added gradually to the coupling suspension through a second dropping funnel. After the coupling reaction has ended, the reaction mixture is diluted with an equal volume of methanol, heated to the boil and boiled under reflux for 8 hours. It is filtered hot and the product is washed, first with hot methanol and then with hot water. After drying and grinding, an intense, greenish-tinged yellow pigment powder is obtained. This pigment mixture consists of the two symmetrical disazo compounds, which are each present in an amount of about 25 mole %, and of the asymmetrical disazo compound, which is present in an amount of about 50 mole %.

After incorporating the resulting pigment mixture in a stoving lacquer, as described in Example 1, intense lacquer coatings of very good fastness to light and excellent fastness to over-lacquering are obtained.

EXAMPLE 9

The procedure is as described in Example 1, except that a mixture of 41.9 g of 5-acetoacetylaminobenzimidazolone and 5.35 g of 7-chloro-5-acetoacetylamino-benzimidazolone is employed as the coupling component. The two coupling components are in a ratio of 90:10 mole %. The after-treatment of the presscake is carried out as in Example 2. If the resulting pigment mixture is incorporated in a stoving lacquer, as is indicated in Example 1, lacquer coatings are obtained which are distinctly more intense, more greenish-tinged and more transparent than the lacquer coatings obtained with the pigment prepared according to Example 1.

A similar result is obtained when the 7-chloro-5-acetoacetylamino-benzimidazolone is replaced by 5.35 g of 6-chloro-5-amino-benzimidazolone.

EXAMPLE 10

The procedure is as described in Example 1, except that 39.6 g of 5-acetoacetylamino-benzimidazolone and 7.4 g of 7-methyl-5-acetoacetylamino-benzimidazolone are employed as the coupling component. The two coupling components are in a ratio of 85:15 mole %. The after-treatment of the presscake is carried out as in Example 2, except that the temperature is kept at 150° C. for 10 hours. The resulting pigment mixture is incorporated in a stoving lacquer, as is described in Example 1. Intense lacquer coatings are obtained, the color shade of which is distinctly more reddish-tinged than that of the lacquer coating obtainable using the pigment prepared according to Example 1.

Similar results are obtained when 7.4 g of 6-methyl-5-acetoacetylamino-benzimidazolone or 7.9 g of 6-methoxy-5-acetoacetylamino-benzimidazolone are employed in place of 7-methyl-5-acetoacetylamino-benzimidazolone.

EXAMPLE 11

5.35 g of 6-chloro-5-acetoacetylamino-benzimidazolone are dissolved in 90 ml of dimethylformamide and 3.0 ml of an aqueous 4N sodium acetate solution are added. The bis-diazonium salt solution is prepared by the method of Example 1 from 2.44 g of 1,2-bis-(2-amino-phenoxy)-ethane. The coupling reaction is carried out at 18°–20° C. in the course of about 1 hour, the bis-diazonium salt solution running in beneath the surface of the vigorously stirred solution of the coupling component. At the same time, 12.0 ml of 4N sodium acetate solution are added gradually from a second dropping funnel. After the coupling reaction has ended, the reaction mixture is stirred for a further 30 minutes at 18°–20° C., an equal volume of methanol is added, the resulting mixture is stirred for 30 minutes at room temperature and filtered and the product is washed, first with methanol and then with water. After drying in a vacuum drying cabinet at 70° C., a soft textured, intense greenish-tinged yellow pigment powder is obtained.

The tables which follow describe further pigments which are obtained analogously to Example 11, by coupling the bis-diazotized diamines of column I with the acetoacetylamino-benzimidazolones of column II. Column III indicates the color shade which is obtained when the pigment is used to produce a lacquer coating of a stoving lacquer which contains 5% of pigment and has been whitened with titanium dioxide in a ratio of 1:5.

| Example | I | II | III |
|---|---|---|---|
| 12 | bis-(2-amino-phenoxy)-methane | 6-chloro-5-acetoacetyl-amino-benzimidazolone | greenish-tinged yellow |
| 13 | bis-(2-amino-phenoxy)-methane | 7-chloro-5-acetoacetyl-amino-benzimidazolone | yellow |
| 14 | bis-(2-amino-phenoxy)-methane | 6-methyl-5-acetoacetyl-amino-benzimidazolone | reddish-tinged yellow |
| 15 | bis-(2-amino-phenoxy)-methane | 7-methyl-5-acetoacetyl- | reddish-tinged yellow |

-continued

| Example | I | II | III |
|---|---|---|---|
| | | amino-benzimidazolone | |
| 16 | bis-(2-amino-phenoxy)-methane | 6-methoxy-5-acetoacetyl-amino-benzimidazolone | reddish-tinged yellow |
| 17 | bis-(3-amino-phenoxy)-methane | 5-acetoacetylamino-benzimidazolone | yellow |
| 18 | 1,2-bis-(2-amino-phenoxy)-ethane | 6-bromo-5-acetoacetyl-amino-benzimidazolone | greenish-tinged yellow |
| 19 | 1,2-bis-(2-amino-phenoxy)-ethane | 6-methyl-5-acetoacetyl-amino-benzimidazolone | reddish-tinged yellow |
| 20 | 1,2-bis-(2-amino-phenoxy)-ethane | 7-methyl-5-acetoacetyl-amino-benzimidazolone | reddish-tinged yellow |
| 21 | 1,2-bis-(2-amino-phenoxy)-ethane | 6-methoxy-5-acetoacetyl-amino-benzimidazolone | reddish-tinged yellow |
| 22 | 1,2-bis-(2-amino-phenoxy)-ethane | 7-methoxy-5-acetoacetyl-amino-benzimidazolone | reddish-tinged yellow |
| 23 | 1,2-bis-(2-amino-phenoxy)-ethane | 5-acetoacetylamino-N1-methyl-benzimidazolone | greenish-tinged yellow |
| 24 | 1,2-bis-(2-amino-phenoxy)-ethane | 5-acetoacetylamino-N1-ethyl-benzimidazolone | greenish-tinged yellow |
| 25 | 1,2-bis-(3-amino-phenoxy)-ethane | 7-chloro-5-acetoacetyl-amino-benzimidazolone | greenish-tinged yellow |
| 26 | 1,2-bis-(4-amino-phenoxy)-ethane | 7-chloro-5-acetoacetyl-amino-benzimidazolone | greenish-tinged yellow |
| 27 | 1,2-bis-(4-amino-phenoxy)-ethane | 6-methyl-5-acetoacetyl-amino-benzimidazolone | reddish-tinged yellow |
| 28 | 1,3-bis-(2-amino-phenoxy)-propane | 6-chloro-5-acetoacetyl-amino-benzimidazolone | yellow |
| 29 | 1,3-bis-(2-amino-phenoxy)-propane | 7-chloro-5-acetoacetyl-amino-benzimidazolone | greenish-tinged yellow |
| 30 | 1,3-bis-(3-amino-phenoxy)-propane | 5-acetoacetylamino-benzimidazolone | yellow |
| 31 | 1,3-bis-(4-amino-phenoxy)-propane | 7-methyl-5-acetoacetyl-amino-benzimidazolone | reddish-tinged yellow |
| 32 | 1,3-bis-(4-amino-phenoxy)-propane | 6-methoxy-5-acetoacetyl-amino-benzimidazolone | reddish-tinged yellow |
| 33 | 1,4-bis-(2-amino-phenoxy)-butane | 7-chloro-5-acetoacetyl-amino-benzimidazolone | greenish-tinged yellow |
| 34 | 1,4-bis-(2-amino-phenoxy)-butane | 7-methyl-5-acetoacetyl-amino-benzimidazolone | reddish-tinged yellow |
| 35 | 1,4-bis-(2-amino-phenoxy)-butane | 6-methoxy-5-acetoacetyl-amino-benzimidazolone | reddish-tinged yellow |
| 36 | 1,4-bis-(3-amino-phenoxy)-butane | 5-acetoacetylamino-benzimidazolone | yellow |
| 37 | 1,4-bis-(4-amino-phenoxy)-butane | 7-chloro-5-acetoacetyl-amino-benzimidazolone | greenish-tinged yellow |
| 38 | 1,4-bis-(4-amino-phenoxy)-butane | 7-methyl-5-acetoacetyl-amino-benzimidazolone | reddish-tinged yellow |
| 39 | 1,4-bis-(4-amino-phenoxy)-butane | 6-methoxy-5-acetoacetyl-amino-benzimidazolone | reddish-tinged yellow |

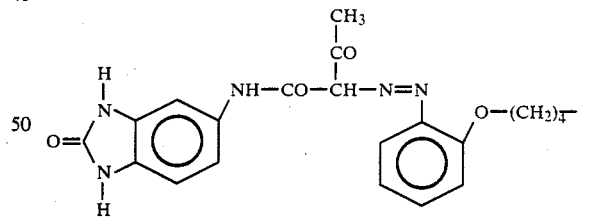

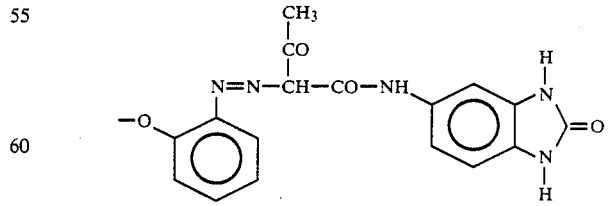

We claim:
1. A compound of the formula